United States Patent [19]

Smith

[11] Patent Number: 5,401,165
[45] Date of Patent: Mar. 28, 1995

[54] REGENERATIVE FURNACE SYSTEM WITH VARIABLE FLUE PORT CONTROL

[75] Inventor: Daniel P. Smith, Worcester, Mass.

[73] Assignee: Morgan Construction Company, Worcester, Mass.

[21] Appl. No.: 943,282

[22] Filed: Sep. 10, 1992

[51] Int. Cl.6 .................................... F27D 17/00
[52] U.S. Cl. ................................ 432/13; 432/179; 432/181
[58] Field of Search ............ 432/179, 180, 181, 182, 432/13, 30

[56] References Cited

U.S. PATENT DOCUMENTS

| | | | |
|---|---|---|---|
| 1,307,338 | 6/1919 | Baumann | 432/182 |
| 1,438,842 | 12/1922 | Majot | 432/182 |
| 1,769,368 | 7/1930 | Danforth, Jr. | 432/182 |
| 1,769,863 | 7/1930 | Smythe | 432/182 |
| 1,798,871 | 3/1931 | Egler | 432/182 |
| 2,538,949 | 1/1951 | Schaefer | 432/182 |
| 3,184,223 | 5/1965 | Webber . | |
| 3,196,086 | 7/1965 | Wethly . | |
| 4,180,128 | 12/1979 | Fallon et al. . | |
| 4,196,776 | 4/1980 | Fallon et al. . | |
| 4,298,372 | 11/1981 | Stover et al. . | |
| 4,470,806 | 9/1984 | Greco . | |
| 4,528,012 | 7/1985 | Sturgill . | |
| 4,874,311 | 10/1989 | Gitman . | |

*Primary Examiner*—Henry C. Yuen
*Attorney, Agent, or Firm*—Samuels, Gauthier & Stevens

[57] ABSTRACT

A regenerative combustion furnace system including a combustion chamber, a pair of primary regenerators, a pair of secondary regenerators, and a gas flow assembly. The gas flow assembly provides gas flow to and from each of the secondary regenerators which are in communication with each respective primary regenerator, and each primary regenerator is in communication with the combustion chamber. Each of the secondary regenerators includes a plurality of flues and a plenum. Each flue includes a primary regenerator port, a plenum port, and a variable position valve.

9 Claims, 3 Drawing Sheets

REGENERATIVE FURNACE SYSTEM WITH VARIABLE FLUE PORT CONTROL

BACKGROUND OF THE INVENTION

The present invention relates generally to waste heat recovery furnace systems which recover a portion of the waste heat generated during combustion, and specifically to regenerative combustion furnace systems in which the flow of gases is regeneratively cycled between two or more flow directions.

Waste heat recovery furnace systems typically involve the collection of a portion of the waste heat produced during combustion, and the application of the collected waste heat to combustion air being delivered to the combustion chamber.

Regenerative furnace system also involve the collection of the waste heat and the application of the collected waste heat to the combustion air, however, regenerative systems typically further involve the cycling of gas flow directions such that the heat collection and the respective heat transfer to incoming air occurs at the same location. For example, U.S. Pat. No. 3,814,223 to Webber and U.S. Pat. No. 4,528,012 to Sturgill each generally discloses regenerative furnace systems in which waste or exhaust gases are passed through a volume of bricks stacked in a staggered pattern (commonly called a "checker"), thus warming the bricks during one cycle, and subsequently combustion air is warmed as it passes through the checkers towards the combustion chamber during a second cycle. A typical regenerative system includes a pair of regenerators which cycle in cooperation with one another.

The regenerators in present regenerative furnace systems typically suffer from significant operational limitations due to variations in temperature within a single regenerator. During use localized areas of high temperature limit the potential of the furnace system and diminish the longevity of the equipment. Some regenerative systems include localized areas (often called "flues") within a regenerator which may help to equalize temperatures within a regenerator. For example, U.S. Pat. No. 3,196,086 to Wethly and U.S. Pat. No. 4,470,806 to Greco disclose regenerative systems involving valves and chambers, respectively. However, even though the flow of gases to and from the localized areas is regulated by valves, each of these disclosures teaches the adjustment of the respective valves in a uniform manner. This is still likely to result in temperature variations between the various localized areas (i.e., cross-flue thermal gradient) within a single regeneration. It is an object of the present invention to minimize for the cross-flue thermal gradient which occurs within a single regenerator.

Certain developments in regenerative systems, largely aimed at improving combustion efficiency, have resulted in the regulation of combustion air in a way which may reduce some of the cross-flue thermal gradient. For example, U.S. Pat. Nos. 4,874,311 to Gitman and 4,298,372 to Stover et al. each discloses the regulation of combustion air flow. The flow of exhaust or waste gas is not, however, directly regulated in either system. Since it is the waste gas which is likely to impose the greatest amount of cross-flue thermal gradient within a regenerator, such a system would not achieve the objectives of the present invention.

It is an object of the present invention to provide for a regenerative furnace system in which the flow of gases to and from at least one regenerator is regulated in such a way that the cross-flue thermal gradient as well as other differences and/or stresses are minimized.

SUMMARY OF THE INVENTION

The invention provides for a regenerative combustion furnace system which allows for regulation of the flow of gases to and from portions of a regenerator. Optimally, the flow is regulated such that the temperature variations within a regenerator are minimized.

The system includes a combustion chamber, a pair of primary regenerators, a pair of secondary regenerators, and a gas flow assembly. The gas flow assembly provides gas flow to and from each of the secondary regenerators which are in communication with the respective primary regenerator, and each primary regenerator is in communication with the combustion chamber. Each of the secondary regenerators includes a plurality of flues and a plenum. Each flue includes a primary regenerator port, a plenum port, and a variable position valve.

The variable position valves regulate the flow of gases to and from the flues within each secondary regenerator such that thermal variations within the furnace, the primary regenerator, and each secondary regenerator are decreased. The variations are decreased, in part, by more evenly distributing temperature and pressure among the flues within each secondary regenerator.

DETAILED DESCRIPTION OF A PREFERRED EMBODIMENT

Figure 1:
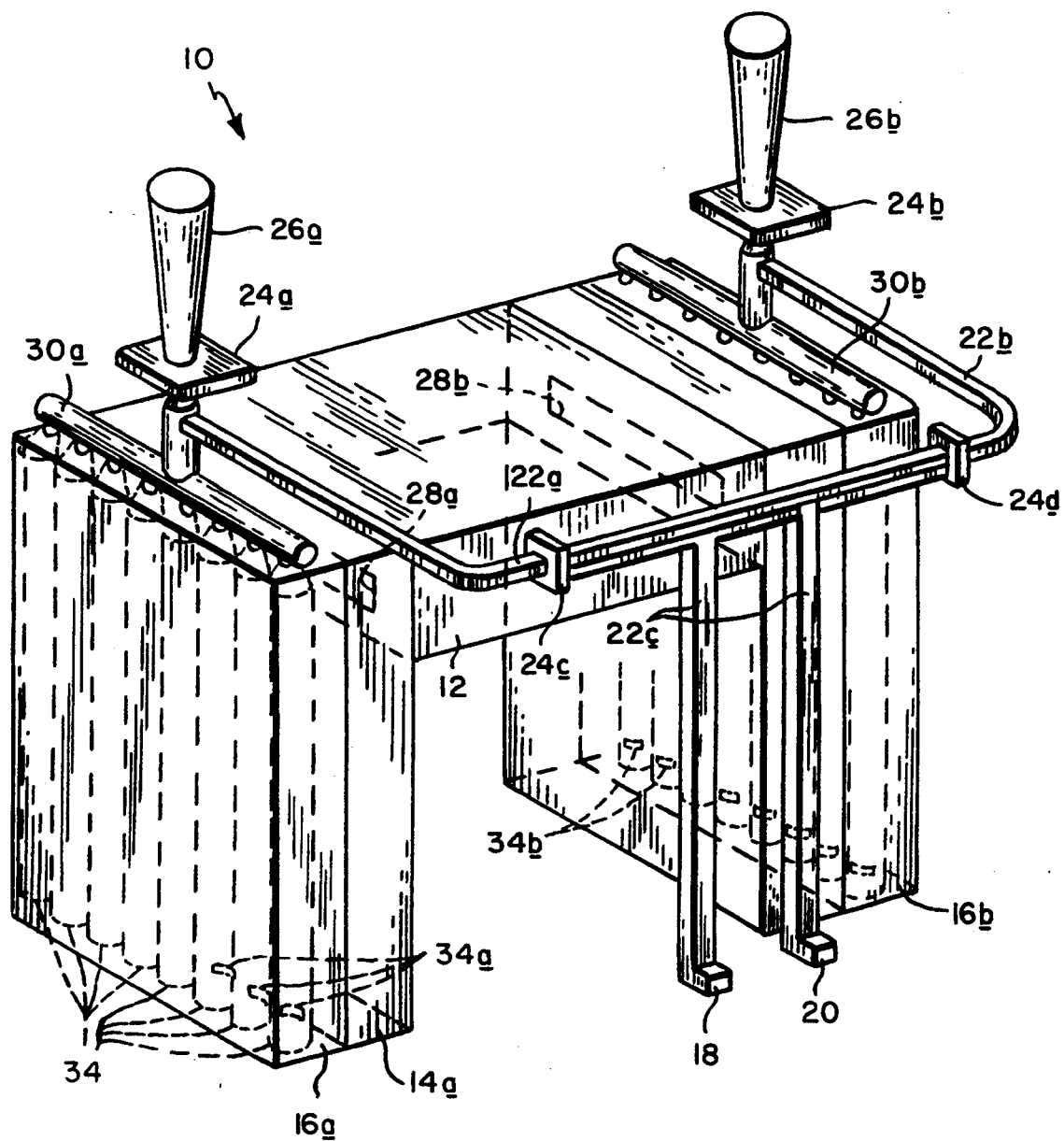
FIG. 1 shows a perspective view of an embodiment of a regenerative furnace system of the present invention.
Figure 2:
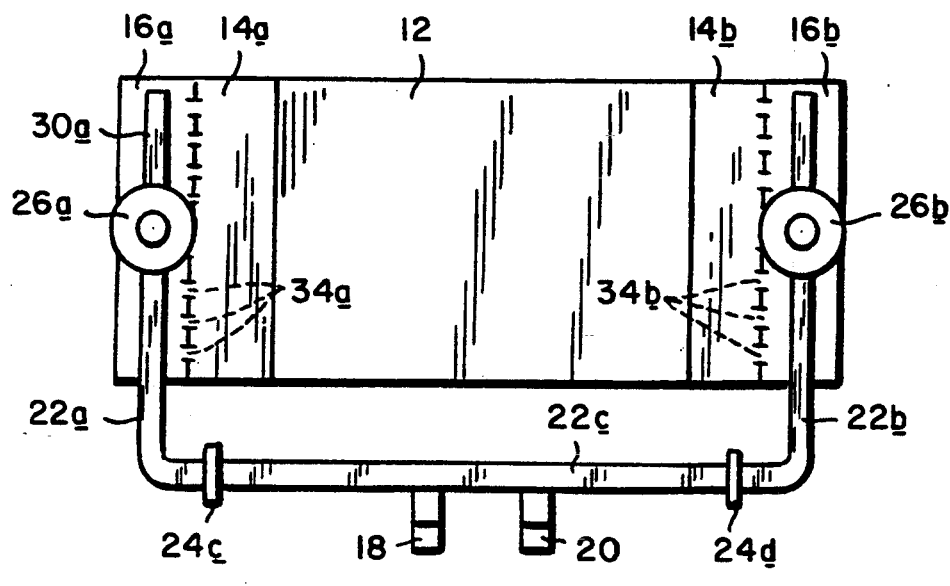
FIG. 2 shows a top view of another embodiment of a system of the present invention.
Figure 3:
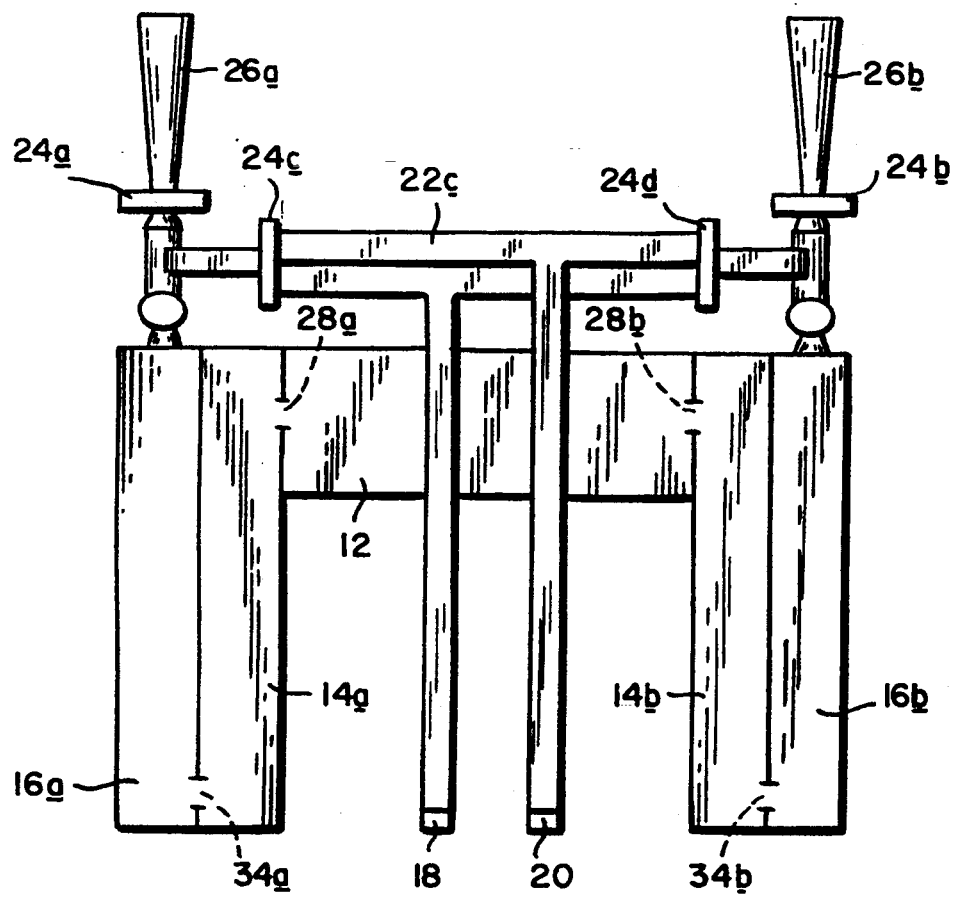
FIG. 3 shows a front view of the system shown in FIG. 2.

An embodiment of a regenerative furnace system 10 of the present invention is shown in FIGS. 1-5. This system includes a combustion chamber 12, a pair of primary regenerators 14a,14b, a pair of secondary regenerators 16a,16b, and a gas flow system. The gas flow system includes combustion fan 18, ejector fan 20, flow ducts 22a,22b, 22c, flow valves 24a,24b,24c,24d and ejector stacks 26a,26b. The primary regenerators 14a,14b each include a combustion chamber opening 28a,28b respectively.

In the present embodiment each secondary regenerator 16a,16b includes a plenum 30a,30b and a set of flues 32a,32b. The bottom of each flue communicates with the associated primary regenerator via passage ways 34a,34b. At the top of each flue 32 is a plenum opening which allows gas to flow between the respective plenum 30, each of the associated flues 32, and the gas flow system.

The combustion occurs within the combustion chamber 12 where, for example, glass may be melted. Each of the regenerators 14,16 contains brickwork which is designed to provide a large amount of brick surface area for gases to pass over. Current regenerators include volumes of bricks stacked in staggered patterns which are typically called "checkers." As hot gas passes through the checkers the bricks are warmed, and as cool incoming combustion air is passed over the warmed bricks, the combustion air is warmed, thus facilitating combustion. The present invention generally concerns the partitioning of secondary regenerators 16 such that the flow of gas to or from the partitioned portions may be regulated.

In operation the present system repeatedly cycles between a first operational mode and a second operational mode. In the first mode the air flow valves 24 are set such that combustion air is directed through the duct portion 22a toward one of the two secondary regenerators 16a, and ejection air is directed through the duct portion 22b toward the ejector stack 26b of the other side of the furnace. The flow valves 24c,24d switch the directions of combustion air and ejection air flowing in the duct portions 22c between directions 22a and 22b. In the second operational mode, the respective directions of the combustion air and the ejection air are reversed so that combustion air is directed towards the plenum 30b, and ejection air is directed towards the ejector stack 26a.

Thus in the first mode combustion air flows into the plenum 30a, through the various flues 32a of the secondary regenerator 16a, through the respective primary regenerator 14a, and into the combustion chamber 12. The combustion air is warmed as it passes over the brickwork within the secondary regenerator 16a and the primary regenerator 14a, both of which had been previously heated.

At the same time, exhaust or waste gas flows to the other side of the furnace through the primary regenerator 14b, through the flues 32b of the secondary regenerator 16b, through the plenum 30b, and is finally drawn up the ejector stack 26b by the flow of ejector air from the duct 22b. The flow of ejector air creates an environment within the ejector stack having a lower pressure than the environment within the plenum and this causes the exhaust or waste gas to be ejected up the ejector stack. This effect is well known.

As the exhaust or waste gas passes over the brickwork within the primary and secondary regenerators 14b,16b, the bricks are warmed as some of the heat from the exhaust gas is lost to them.

In the second mode, all of the flow valves 24 reverse such that combustion air is drawn over the regenerator bricks within the first and secondary regenerators 14b,16b which were recently warmed, and exhaust or waste gas is exhausted over the regenerator bricks within the first and second regenerators 14a,16b which were used to warm the combustion air in the previous cycle. Thus some of the heat from the waste gas is stored by regenerator bricks, and this stored heat is subsequently used to preheat incoming combustion gas. In alternative embodiments, the switching of the flow valves 24 might not occur simultaneously. Also, the gas flow system could include a supplemental fan as a back-up in case of failure of either fan 18 or 20.

The present invention particularly concerns the regulation of gas flow within each of the secondary regenerators 16. If the gas flow within each secondary regenerator were not regulated, then large temperature gradients would result within the furnace, each primary regenerator, and each secondary regenerator. These temperature gradients would be due to varying flow and heating patterns within the furnace along with unequal gas travel paths between each flue 32 and its connecting duct 22. The high temperature portions (commonly called "hot spots") limit the amount of production which can be harnessed from such a furnace system. The hot spots also detract from the longevity of the furnace equipment.

Figure 4:
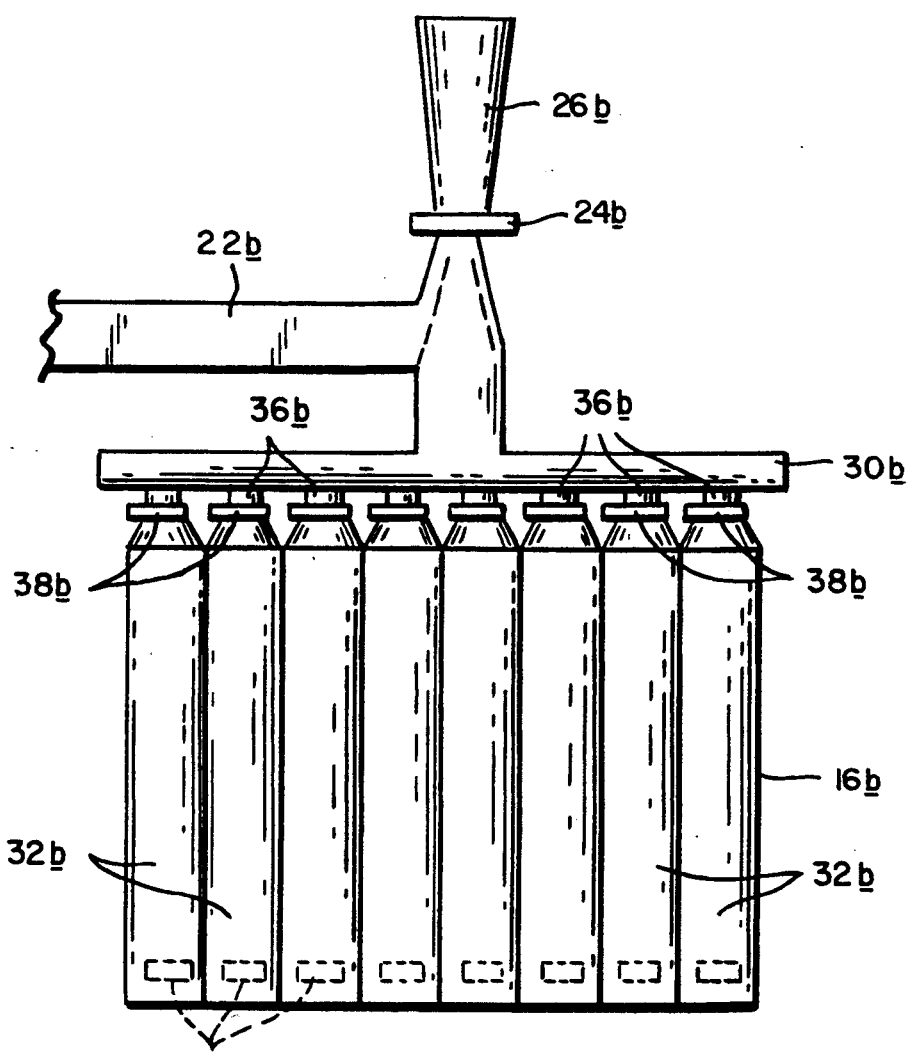
FIG. 4 shows a side view of a portion of the system shown in FIG. 2.
Figure 5:
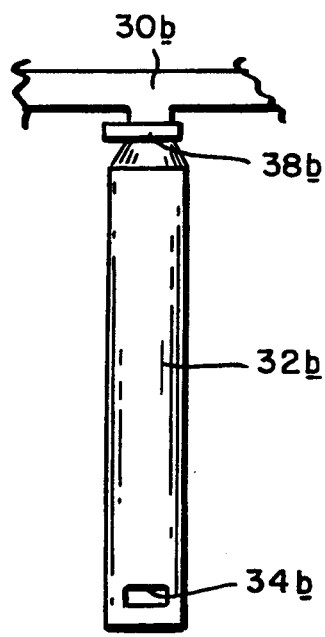
FIG. 5 shows a side view of a portion of the system shown in FIG. 4.

As shown in FIGS. 4 and 5, in the present embodiment, the secondary regenerators 16a,16b are each partitioned into eight flues 32a,32b, and each flue 32 has two ports 34,36 and a variable position valve 38. One of the ports 34 connects to the associated primary regenerator 14 and the other port 36 connects to the associated plenum 30. The variable position valves 38 are adjusted so that the flow of gas between the plenum 30 and the flues 32 is urged to be similar in volume and rate for each of the eight flues for each secondary regenerator 16.

In another embodiment of the invention, flow sensors may be positioned at various places, such as within the flues 32, for monitoring the flow of gas at various locations. Outputs from these sensors may be connected to a programmable logic controller. The programmable logic controller might then be connected to each of the flue valves 38 such that the flow of gas through each of the flue valves 38 may be controlled by the programmable logic controller responsive to the sensor outputs.

Those skilled in the art will appreciate that modifications may be made to any of the above embodiments without parting from the scope of the invention.

I claim:

1. A regenerative combustion furnace system comprising a combustion chamber, a pair of primary regenerators, each primary regenerator being in gas communication with said combustion chamber, a pair of secondary regenerators, each secondary regenerator being in gas communication with a respective one of said two primary regenerators, and gas flow means for providing gas flow to and from each of said secondary regenerators, wherein each said secondary regenerator comprises:
   a) a plurality of flues subdividing each said secondary regenerator;
   b) a plenum;
   c) a first connector means for connecting each of said flues to said plenum;
   d) a second connector means for connecting said gas flow means to each said plenum; and
   e) flow control means for varying the flow of gas between each of said flues and said plenum.

2. Apparatus as claimed in claim 1, wherein said gas flow means includes a conduit connected to each of said plenums, and a fan for blowing forced gas into said conduit towards each of the secondary regenerators.

3. Apparatus as claimed in claim 2, wherein each said secondary regenerator further includes a flow direction switch for switching the direction of said forced gas between a first direction and a second direction such that said first direction directs the forced gas towards said respective plenum and said second direction directs said forced gas towards an ejector means for ejecting gas from said secondary regenerator.

4. Apparatus as claimed in claim 1, wherein said gas flow means includes a conduit connected to each of the secondary regenerators, a combustion blower fan for blowing combustion gas into the conduit, an ejector blower fan for blowing ejector gas into the conduit, and a blower fan switch means for switching the directions of the combustion gas and the ejector gas such that each of the combustion gas and the ejector gas is directed toward one of each of the secondary regenerators.

5. Apparatus as claimed in claim 1, wherein each of said flues further include rate sensor means for sensing the rate of flow of gasses to and from each of said flues.

6. Apparatus as claimed in claim 1, wherein each of said flues further include volume sensor means for sensing the volume of flow of gasses to and from each of said flues.

7. Apparatus as claimed in claim 1, wherein said variable position valve means further includes a variable position valve within each flue and a programmable logic controller for controlling the position of each of the variable position valves.

8. A method of regeneratively operating a combustion furnace system comprising a combustion chamber, a pair of primary regenerators, a pair of secondary regenerators, and gas flow means for providing gas flow to and from each of said secondary regenerators, wherein said method includes a first operational mode comprising the steps of:
   a) drawing combustion gas toward said combustion chamber through a first of said secondary regenerators and through a first of said primary regenerators;
   b) releasing ejection gas from said combustion chamber through a second of said primary regenerators and through a second of said secondary regenerators;
   c) dividing each of the respective volumes of flow of said combustion gas and said ejection gas through each of said secondary regenerators into a plurality of channels wherein each said channel includes a valve; and
   d) varying the positions of each of said respective valves.

9. A regenerative combustion furnace system comprising a combustion chamber, a pair of primary regenerators, each primary regenerator being in gas communication with said combustion chamber, a pair of secondary regenerators, each secondary regenerator being in gas communication with a respective one of said two primary regenerators, and gas flow means for providing gas flow to and from each of said secondary regenerators, wherein each said secondary regenerator comprises:
   a) at least three flues subdividing each said secondary regenerator;
   b) a plenum;
   c) a first connector means for connecting each of said flues to said plenum;
   d) a second connector means for connecting each said gas flow means to each said plenum; and
   e) flow control means for varying the flow of gas between each of said flues and said plenum.

* * * * *